United States Patent [19]
Doraswamy et al.

[11] Patent Number: 6,128,642
[45] Date of Patent: Oct. 3, 2000

[54] LOAD BALANCING BASED ON QUEUE LENGTH, IN A NETWORK OF PROCESSOR STATIONS

[75] Inventors: Naganand Doraswamy, Woburn, Mass.; Kadangode K. Ramakrishnan, Berkeley Heights, N.J.

[73] Assignee: AT&T Corporation, New York, N.Y.

[21] Appl. No.: 08/898,074

[22] Filed: Jul. 22, 1997

[51] Int. Cl.[7] ................................... G06F 15/16
[52] U.S. Cl. ................ 709/201; 709/202; 709/219; 709/224; 709/105
[58] Field of Search .................. 709/102, 105, 709/200–203, 217–219, 223–228, 238, 314

[56] References Cited

U.S. PATENT DOCUMENTS

| | | | |
|---|---|---|---|
| 5,539,883 | 7/1996 | Allon et al. | 709/105 |
| 5,548,724 | 8/1996 | Akizawa et al. | 709/203 |
| 5,592,672 | 1/1997 | Grewal et al. | 709/105 |
| 5,655,120 | 8/1997 | Witte et al. | 709/105 |
| 5,774,668 | 6/1998 | Choquier et al. | 709/223 |
| 5,867,706 | 2/1999 | Martin et al. | 709/105 |
| 5,872,972 | 2/1999 | Boland et al. | 709/102 |

OTHER PUBLICATIONS

Mor Harchol–Balter, Allen B. Downey, *Exploiting Process Lifetime Distributions for Dynamic Load Balancing*, University of California at Berkeley, {harchol, downey}@cs.berkeley.edu. No date.

Michael J. Litzkow et al., *Condor—A Hunter of Idle Workstations*, Department of Computer Sciences, University of Wisconsin, Madison, WI 53706. No date.

Derek L. Eager et al., *Adaptive Load Sharing in Homogeneous Distributed Systems*, IEEE Transactions of Software Engineering, vol. SE–12, No. 5, May 1986.

*Primary Examiner*—Ahmad F. Matar
*Assistant Examiner*—Bharat Barot
*Attorney, Agent, or Firm*—Kenyon & Kenyon

[57] ABSTRACT

A method for distributing a job load from a local processor station to at least one processor station within a plurality of processor stations connected by a multiaccess channel. A job is selected for remote execution from the local processor so that the average load value of the local processor station is reduced to the average load value of the processor station having the lowest average load value from a subset of processor stations. The average load value can be, for example, average utilization or average queue length.

16 Claims, 2 Drawing Sheets

LOAD BALANCING BASED ON QUEUE LENGTH, IN A NETWORK OF PROCESSOR STATIONS

FIELD OF THE INVENTION

The present invention relates generally to the field of distributed computing and the field of telecommunications. Specifically, the present invention relates to load balancing in a network of processor stations.

BACKGROUND OF THE INVENTION

Clusters of workstations are becoming popular alternatives to large scale computing systems. For example, a network of workstations can act as a server farm, where the processing loads are distributed among available workstations, for serving World Wide Web access. A network of shared workstations are an attractive alternative to large scale computer systems because the workstations can share the necessary processing of jobs across the multiple workstations.

On a network of shared workstations, load balancing is the idea of migrating processing jobs across the network from host workstations with high loads to host workstations with lower loads. The motivation for load balancing is to reduce the average completion time of a processing job and to improve the utilization of the workstations.

Two broad classes of load balancing mechanisms exist: 1) preemptive load balancing and 2) non-preemptive load balancing. Preemptive load balancing mechanisms suspend the processing of a job, move that suspended job to a remote host and then restart the processing of that job. Preemptive load balancing mechanisms are very complex because they involve checkpointing (saving of the state of a processing job), moving state information, as well as moving a network transport level connection to another workstation processor station.

Non-preemptive load balancing mechanisms control the distribution of processing jobs for remote execution based on a priori knowledge of the workstations' behavior. In a typical known system using non-preemptive load balancing, workstations on the network are polled to determine their availability to receive processing jobs for remote execution.

In one known system, for example, a central coordinator connected to the network polls the other workstations on the network to determine their availability. Background jobs are off-loaded to available remote workstations until local activity at those remote workstations is detected; upon detecting local activity, background jobs are preempted so that the user can use the workstation. See "Condor a Hunter of Idle Workstations" by Michael Litzkow, et al., Proceedings of the 8th International Conference on Distributed Computing Systems, June 1988.

In another known system, each workstation on a network determines the availability of other workstations. First, each workstation on the network locally determines if the number of jobs waiting for execution exceeds a predetermined threshold. If the number of waiting jobs is below the threshold, then the jobs are processed locally. If the number of waiting jobs exceeds the threshold, then the local workstation randomly probes a remote workstation in the network to determine whether the number of processing jobs already in service or waiting for service at that remote workstation are less than some threshold value. Probing the remote workstation is performed at the time the processing job is ready for processing; consequently, the processing job waits for processing until this probing for an available remote workstation is completed. If that probed workstation is available, then the processing job is transferred to that workstation regardless of the state of that workstation when the job arrives. If the probed workstation is not available, then additional workstations are probed until an available workstation is found or until a timeout occurs. In the latter case, the local workstation must process the job. See "Adaptive Load Sharing in Homogenous Distributed Systems" by Derek Eager, et al., IEEE Transactions on Software Engineering, Vol. 12, No. 5, May 1986.

These known systems, however, suffer several shortcomings. First, these systems do not scale well as the number of workstations on the network increases. When there are a large number of workstations on the network, the amount of information exchanged among the workstations increases with the number of workstations available for load balancing. As a result, the overall performance of the network does not improve as the number of workstations available on a network increases.

Second, these known systems suffer from latency problems associated with seeking the state information prior to moving a processing job and from the inefficient use of the communication channel connecting the processors. In other words, while the state information of a remote processor station is being sought, the processing job is waiting to be processed. This waiting causes increased delay before the processing job can be processed.

Additionally, because the sender or receiver in these systems initiate the transfer of a processing job for remote execution, a substantial period of time can elapse from when the local workstation receives state information about the target workstation and when the target processor station actually receives the processing job for remote execution. During this elapsed period of time, a previously available target workstation can become suddenly unavailable due to a large number of queued processor jobs recently received for remote execution. Any late arriving processing jobs received at a suddenly busy target workstation must be redistributed to other processor stations that are more available. This process can result in multiple transfers of processing jobs to previously available target workstations that, in fact, are not available for remotely executing processing jobs.

SUMMARY OF THE INVENTION

The present invention improves load balancing within a network of processor stations by allowing each individual processor station to decide whether to send out a processing job for remote execution. Each individual processor station periodically receives state information from the remaining processor stations and uses this received state information to determine whether to off-load processing jobs for remote execution. The state information is sent once every announcement interval; the state information is averaged over the announcement interval.

The present invention can distribute the processing jobs selected for remote execution over several available processor stations. Consequently, multiple transfers are not necessary and processing jobs are more likely distributed only once to available processor stations. Because multiple transfers are not necessary, the present invention improves the stability of load balancing within the network of processor stations.

The present invention improves the scalability of load balancing within a network of processor stations. The present invention effectively performs load balancing within a network of processor stations even as additional processor stations are added to the network.

Processing jobs can be distributed from a local processor station to another processor station within the network. Each processor station repeatedly multicasts, to the other processor stations in the network, status announcements comprising state information, averaged over the announcement interval, indicating the extent that the processor station is busy processing jobs. The extent that the processor station is busy processing jobs will be referred to herein generically as a "load value."

Each local processor can select processing jobs for remote execution and can select a subset of processor stations on the network that have an average load value less than the load value of the local processor station by a threshold. Each local processor off-loads the selected processing jobs so that the load value of the local processor station is reduced to a target load value corresponding to the average load values of the processor stations in the subset. The selected jobs can be distributed among the processor stations in the subset of processor stations.

In one embodiment of the present invention, the load value of the local processor station corresponds to a utilization averaged over the announcement interval; each average load value of other processor stations corresponds to a utilization for each respective processor station averaged over the announcement interval. Utilization is the percent of time that a processor station is processing jobs. In this embodiment, processing jobs are selected for off-loading so that the utilization of the local processor station is reduced to substantially the average utilization of the processor station in the subset having the lowest average utilization.

In another embodiment of the present invention, the load value of the local processor station corresponds to an instantaneous queue length of the local processor station; the instantaneous queue length indicates the number of jobs awaiting processing. Each average load value of other processor stations corresponds to a queue length for each respective processor station averaged over the announcement interval. In this embodiment, processing jobs are selected so that the instantaneous queue length of the local processor is reduced to substantially the sum of the average queue length of the processor stations in the subset and a threshold.

A multicast packet, also referred to as a status announcement, can be received at each processor station, over the communications channel. The status announcement can indicate the average load value of each remaining processor station in the network. The average load value can correspond to the average utilization or the average queue length of a processor station. Status announcements can be received periodically with updated average load values every announcement interval.

Each local processor station can send, over the communications channel, a status announcement indicating the average load value of that local processor station. Status announcements can be sent, for example, periodically every announcement interval.

Each local processor station can select target processor stations from the subset for remote execution of jobs selected for off-loading. Each local processor station can send the one or more jobs selected for off-loading to one or more target processor stations. The target processor station can be selected from the subset of processor stations randomly or by a round robin selection.

The decision to off-load jobs that have been selected for remote execution can be performed using hysteresis. Using hysteresis, processing jobs selected for remote execution will be off-loaded only when the number of packets associated with the selected jobs and queued for output to the network is less than a high-level mark, and when the high-level mark was previously exceeded, the number of packets associated with processing jobs and queued for output to the network is less than a low-level mark.

DETAILED DESCRIPTION

Figure 1:
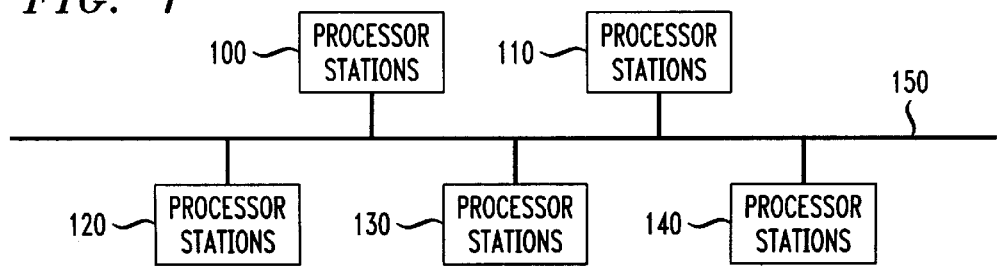
FIG. 1 illustrates a network of processor stations according to an embodiment of the present invention.

FIG. 1 illustrates a network of processor stations according to an embodiment of the present invention. Processor stations 100, 110, 120, 130 and 140 are connected to communication channel 150.

Processor stations 100, 110, 120, 130 and 140 each comprise a processor, a computer-readable memory, an input port to be coupled to an input device such as a keyboard, an output port to be coupled to an output device such as a monitor and a network port to be coupled to communication channel 150. Processor stations 100 through 140 can receive jobs for processing through the input port. For example, the job can be sent for processing by a user using the input device, such as a keyboard, co-located with the processor station or remotely located from the processor station connected by a communication network. Processor stations 100 through 140 can be workstations such as the VAXstation II® by the Digital Equipment Corporation or the SPARCstation™ 4 workstation by Sun Microsystems. Processor stations 100 through 140 run appropriate software, such as UNIX-based software.

Communications channel 150 is a transmission medium connecting processor stations 100 through 140. For example, communications channel 150 can connect the processor stations in a bus topology and can comprise such transmission medium as an optical fiber. Because optical fiber can handle data rates of 100 Mbps (megabits per second), optical fiber can be an effective transmission media for communications channel 150. Alternatively, communication channel 150 can comprise a transmission medium of baseband coaxial cable or broadband coaxial cable.

Figure 2A:
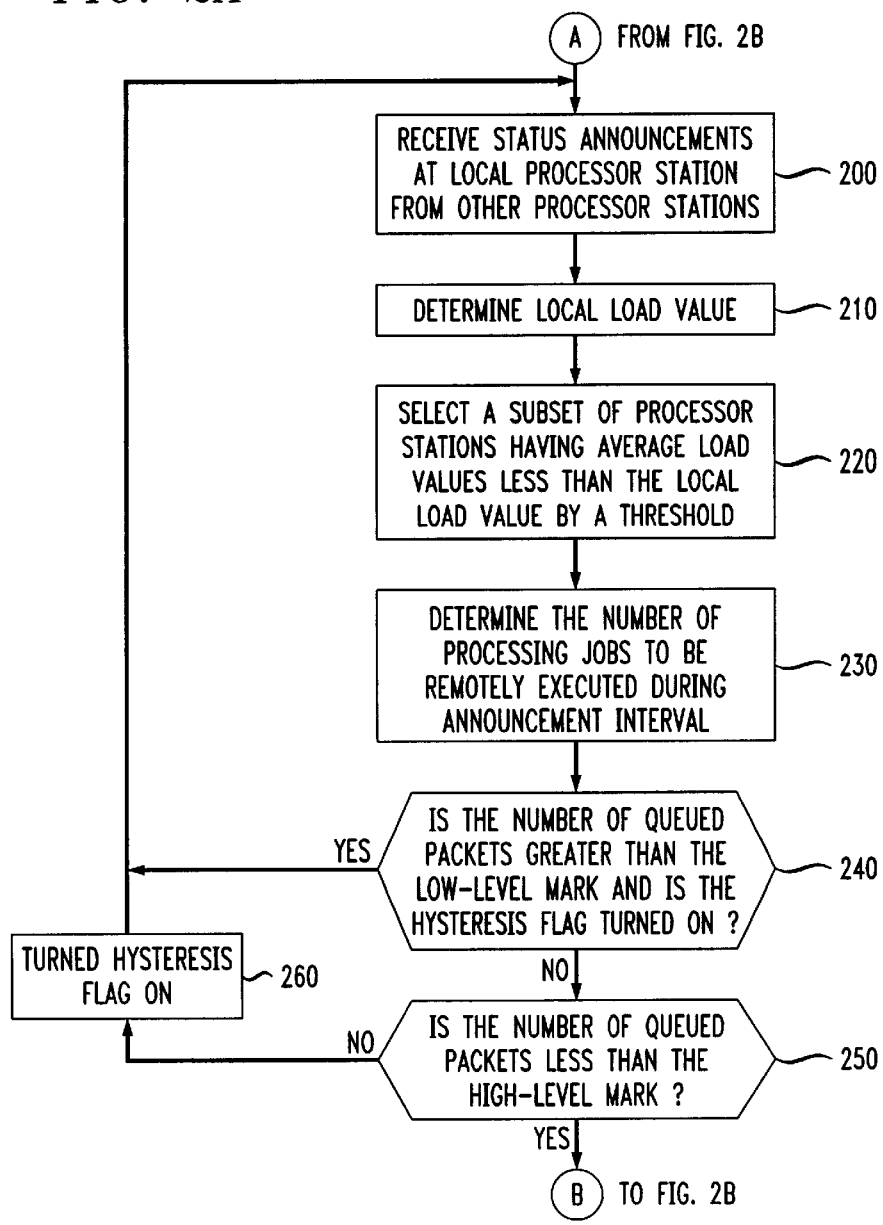
FIGS. 2A and 2B are a flow chart illustrating a method for load balancing in a network of processor stations, according to an embodiment of the present invention.
Figure 2B:
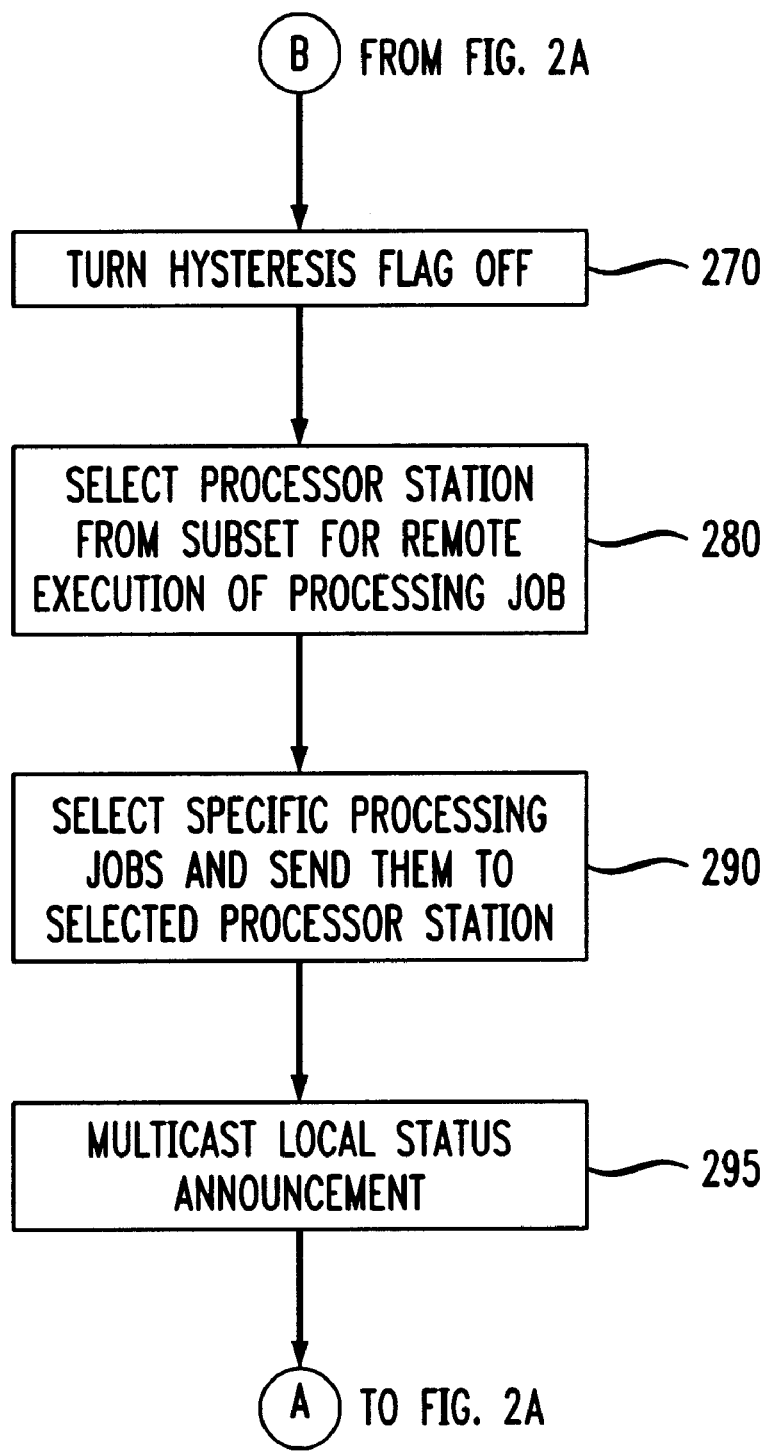

FIG. 2 is a flow chart illustrating a method for load balancing in a network of processor stations, according to an embodiment of the present invention. The method for load balancing illustrated in FIG. 2 can be implemented by appropriate software located on each processor station 100 through 140.

As shown in FIG. 2, the method begins at step 200 where a local processor station receives status announcements from the other processor stations in the network. Although FIG. 2 illustrates the method as performed by a single local processor station, each processor station in the network also can perform the same method from its own local perspective. In other words, the load balancing mechanism of the present invention can be performed in a distributed manner with each processor station making local decisions. Consequently, although FIG. 2 will be discussed with respect to a single local processor, it should be understood that the method described in FIG. 2 can be concurrently performed by the remaining processor stations in the network.

The status announcements can be multicast packets transmitted by each processor station to all the other processor stations in the network. The status announcement can contain state information on each processor station including an average load value indicating the load of the processor station's processor averaged over an announcement interval, W.

The status announcements for each local processor station are updated and repeatedly announced (or multicasted) to all the other processor stations in the network. For example, the status announcements can be periodically multicasted to all the other processor stations in the network every announcement interval, W.

The announcement interval, W, can be selected to optimize the communication channel overhead consumed in sending these status announcements and the stability of the load balancing mechanism. In other words, if the announcement interval is too short, then the communications channel will be overloaded by attempts to deliver too many status announcements. Additionally, if the announcement interval is too short, the processor stations in the network waste time processing status announcements that are not necessarily needed and thereby unnecessarily consuming both network resources and the resources of the processor stations. Conversely, if the announcement interval is too long, then the state information which local processor stations rely upon to make load balancing decisions will be outdated; a previously available target processor station will no longer be available by the time an off-loaded processing job arrives at the target processor station. Consequently, the announcement interval should be selected to avoid overloading the communications channel while allowing the processing stations to receive status announcements having sufficiently updated state information. It appears that the announcement interval should be a function of a typical job execution time. The interval between the sending of announcements can be selected, for example, to be ten times the mean processing job execution time.

Because status announcements can be periodically sent by each processor station in the network, the communication channel should not be bottle necked by the transmission of these status announcements as well as by the transmission of processing jobs being relocated for remote execution. Consequently, the communication channel should provide sufficiently high speed transmission of data. For example, the communication channel can be a fast Ethernet operating at 100 Mbps. A high speed communication channel ensures that processing jobs placed on the network for remote execution get access to the communication channel in a timely manner.

In one embodiment of the present invention, the average load value corresponds to utilization for a processor station averaged over the announcement interval, W. The local processor receives a status announcement from each processor station indicating its average utilization. Utilization is the fraction of time that a processor station is busy processing jobs. The processing time can include the time for processing jobs, and for receiving and transmitting jobs and status announcements. The average utilization is measured by each processor station individually and reflects the utilization for that particular local processor station.

In another embodiment of the present invention, the average load value corresponds to the queue length of the processor station averaged over announcement interval, W. The term "queue length" is used herein as the number of processing jobs awaiting service at the processor station; the waiting jobs include the jobs waiting to be processed as well as the jobs being considered for remote execution by the load balancing mechanism. The local processor station receives a status announcement indicating the average queue length of each processor station. Each processor station determines its average queue length by sampling the local queue length several times during the announcement interval and then averaging the measured queue lengths. For example, the queue length can be sampled twenty times during each announcement interval. In an alternative embodiment, the queue length can be based on the number of queue packets, rather than the number of queued jobs.

In step 210, the local processor station determines its local value for the load value.

In an embodiment where the load value of the local processor station corresponds to utilization of the local processor station, the local processor station will determine its local short-term average utilization by calculating the utilization over the announcement interval. The local average utilization is the amount of time actually spent in executing processing jobs over an announcement interval, W. Very short term transients are overcome by averaging the utilization over the announcement interval, W. Because execution times for current and future processing jobs cannot be known or even estimated, the average utilization is calculated using actual job execution times because that is the only information available at the local processor station when load balancing decisions is made.

In another embodiment where the load value of the local processor station corresponds to the instantaneous queue length of the local processor station, the local processor station estimates its instantaneous queue length by sampling the local queue length. As discussed below in connection with step 295 where the local processor station multicasts its own status announcement with its average load values, the local average queue length can also be determined. The local processor station determines its average queue length by sampling the local queue length several times during the announcement interval, "W". For example, the queue length can be sampled twenty times during each announcement interval. The average queue length value is obtained by averaging the measured queue lengths over the announcement interval.

At step 220, the local processor station selects a subset of processor stations having an average load value less than the local load value of the local processor station by a certain threshold. In other words, at step 220, a subset of processor stations which are the least busy are selected.

In an embodiment where the load value corresponds to utilization, the local processor station selects a subset of processor stations having an average utilization less than the local average utilization by a certain threshold. For example, five percent can be selected as a reasonable threshold. In such a case, the processor station locally selects a subset of processor stations comprising all processor stations having a lower average utilization that is less than the local average utilization by at least five percent.

In another embodiment where the load value corresponds to queue length, the local processor station selects a subset of processor stations comprising all processor stations having an average queue length that is less than the local instantaneous queue length by a certain threshold. For example, the threshold can be 0.5. In such a case, the local processor station locally selects a subset of processor stations comprising all processor stations having an average queue length that is less than the local instantaneous queue length by 0.5 jobs (or an appropriately small threshold).

A processor station is considered to be a candidate for the subset only if the local processor station has received at least one status announcement from that station in the last several announcement intervals. For example, a processor station can be excluded from consideration for the subset if the local processor station has not received a status announcement from that processor station in the last five announcement intervals.

Note that a different subset of processor stations can be determined by each processor station entirely in a distributed manner; each processor station has its own view of which processor stations make up each subset eligible to receive processing jobs for remote execution.

At step 230, the local processor station determines the number of processing jobs to be remotely executed during the announcement interval, W. A sufficient number of processing jobs are selected for remote execution so that the load value of the local processor station is reduced to a target load value. The target load value corresponds to the average load values of the processor stations in the subset. The number of processing jobs to be remotely executed is calculated locally by each processor station, thereby minimizing the need for frequent updates of the state information from each processor station; frequent updates would otherwise be needed to avoid any overcorrection in the load balancing mechanism.

In an embodiment where the load value corresponds to utilization, the number of processing jobs to be remotely executed by the processor stations in the subset can be calculated by the following formula:

$$J = \frac{\tau}{y + p_t + o_t}$$

where:

J is the number of jobs that need to be off-loaded from a local processor station for remote execution;

$\tau$ is the amount of execution time, measured with respect to the local processor station, to be off-loaded by moving some jobs to at least one other processor station;

y is the average service time per processing job executed over the most recent previous W;

$p_t$ is the processing time needed to decide whether to execute the job either locally or remotely; and $o_t$ is the fixed overhead associated with transmitting a processor job to a remote processor station.

The amount of execution time to be off-loaded to another processor station, $\tau$, can be calculated by the following equation:

$$\tau = \left(\frac{N * (y + p_t)}{W} - U\right) * W$$

where:

N is the number of processing jobs that have been executed in the current W, and U is the target utilization.

Note that W, the announcement interval, can be customized to optimize load balancing in the network. The target utilization is the utilization of the processor station having the lowest average utilization from the selected subset of processor stations.

In another embodiment where the load value corresponds to queue length, whenever the local instantaneous queue length exceeds the average queue length of the processor stations in the subset by a threshold, a queued processing job is off-loaded for remote execution. In other words, if the local instantaneous queue length exceeds the average queue length of the processor stations in the subset by a threshold, then the local processing job is off-loaded. The threshold, for example, can be 0.5. In such a case, the queued processing job will be off-loaded to a subset of processor stations whose average queue length is at least 0.5 jobs (or an appropriately small threshold value) less than the local instantaneous queue length.

The local instantaneous queue length can be determined by using the most recent local queue length sample from the several samples that are collected during each announcement interval.

To minimize queuing delays to the network due to processing jobs being off-loaded for remote execution, the number of packets queued locally at each processor station to gain access to the network is limited. Specifically, hysteresis can be used to avoid reacting to transient changes when operating under heavy load. Hysteresis can be used with the embodiments where the load value corresponds to utilization or corresponds to queue length.

Hysteresis can be implemented by using a high-level mark and a low-level mark. When the queue of packets waiting for access to the network at a given processor station is greater than the high-level mark, that processor station ceases sending any additional processing jobs out for remote execution until the queue length is less than the low-level mark. Additional processing jobs cease to be off-loaded onto the network until the queue length is less than the low-level mark, even if the load balancing decision made in step 230 indicates that one or more processing jobs should be remotely executed. For example, a high-level mark of five packets and a low-level mark of two packets can be selected. In one embodiment of the present invention, this hysteresis technique is implemented in conditional steps 240 and 250.

At conditional step 240, the local processor station checks whether the number of queued packets is greater than the low-level mark and checks whether the hysteresis flag has been turned on. The hysteresis flag indicates whether the number of packets queued to the network has exceeded the high-level mark during a previous announcement interval. At step 240, if the number of queued packets is greater than the low-level mark and the hysteresis flag is turned on, then the method proceeds back to step 200 and no processing jobs are off-loaded for remote execution during this announcement interval. At conditional step 240, if the number of queued packets is not greater than a low-level mark, or the hysteresis flag has not been turned on, then the method proceeds to conditional step 250.

At conditional step 250, the local processor station checks whether the number of queued packets is less than the high-level mark. If the number of queued packets is not less than the high-level mark, than the method proceeds to step 260, where the hysteresis flag is turned on and the method returns back to step 200; no processing jobs are sent out for remote execution during this particular announcement interval. At conditional step 250, if the number of queued packets is less than the high-level mark, then the method proceeds to step 270.

At step 270, the hysteresis flag is turned off. Turning off the hysteresis flag indicates that although the number of processing jobs queued for remote execution previously exceeded the high-level mark, the number of queued processing jobs has been reduced below the low-level mark. Consequently, future processing jobs exceeding the low-level mark can be remotely executed without the communications channel of the network being bottle necked due too many processing jobs being transferred. In other words, when conditional step 240 is performed in future announcement intervals, the method will proceed to conditional step 250 while the hysteresis flag continues to be turned off.

At step 280, the local processor station selects a processor station from the subset of processor station to which processing jobs are to be off-loaded for remote execution. At step 280, one or more target processor stations can be selected from the subset for remote execution of processing jobs in a variety of manners. For example, the target processor station(s) can be selected from the subset by random or by round robin.

Consider, for example, the case where a local processor station has four jobs to off-load and the subset comprises four processor stations. Using the random method of selection, the local processor station would randomly select a processor station from the subset for each processing job to be off-loaded; in such a case it is possible that a given target processor station in the subset may receive more than one job for remote execution. Using the round robin method of selection, the local processor station would off-load the first job to the first target processor station in the subset, the second job to the second target processor station in the subset, etc.; in such a case each processor station in the subset will receive an off-loaded processing job. Of course, in the case when there are more processing jobs than processor stations in the subset, the local processor station using the round robin method would off-load a processing job to each processor station in the subset and then continue off-loading jobs in the same order, restarting at the first target processor station, until all selected processor jobs are off-loaded.

Because the selection of one or more target processor stations from the subset is made in a distributed manner, each individual processor station that will be off-loading processing jobs for remote execution can make its own individual selection of target processor station(s) from the available subset and in its own individual manner. For example, one local processor station can use a random method to select one or more target processor stations from the subset for remote execution, while a separate local processor station can select one or more different target processor stations from its own selected subset in an entirely different manner, such as the round robin method.

At step 290, the local processor station selects processing jobs for remote execution equal in number to that determined in step 230; the selected processor jobs are distributed to the processor stations within the subset selected in step 280. Specific processing jobs can be selected for remote execution in a number of ways including, for example, by selecting the jobs randomly, selecting the most recently received jobs, selecting the jobs having the longest time queued, selecting jobs with certain attributes (e.g., graphics intensive).

Processing jobs can be transferred from the local processor station to the target processor station in a number of ways. If the processor stations within the network have access to a distributed file system, the local processor can transfer the network addresses of the processing jobs. Upon receiving the network addresses of the processing jobs, the target processor station can execute the processing jobs by accessing the processing jobs through the distributed file system. In the case where the processor stations within the network do not have access to a distributed file system, the processing job can be transferred to the target processor station along with a header containing, for example, state information, the target processor station identification number, and the local processor station identification number.

At step 295, the local processor multicasts a status announcement to all the other processor stations in the network. After step 295, where the local processor station multicasts its local status announcements, the method again restarts beginning at step 200 for the next announcement interval.

The status announcement can contain state information for the local processor station including an average load value indicating the average load of the local processor station. In an embodiment of the present invention, the status announcement includes the following information: the queue length of the local processor station averaged over the most recent announcement interval, the utilization of the local processor station averaged over the most recent announcement interval, a local processor station identification number, a processor station type identifier (e.g., indicating processor speed), and a number indicating the length of the status announcement. By including, in the status announcement, both the average queue length and the average utilization of the local processor, the same status announcement can be sent whether or not the remaining processor stations are using average utilization or average queue length to make remote execution determinations.

It should of course be understood that while the present invention has been described in reference to a particular system configuration and process, other system configurations and processes should be apparent to those of ordinary skill in the art. For example, the present invention can include any number of processor stations and multiaccess channels. The network of the present invention can also include a cluster of processor stations or a server farm for use with another network, such as the World Wide Web.

What is claimed is:

1. A method for distributing a job load from a local processor station to at least one processor station within a plurality of processor stations connected by a communications channel, comprising:

(a) selecting at least one job for remote execution from the local processor station so that a load value of the local processor station is reduced to a target load value corresponding to an average load value of other processor stations in the plurality of processor stations; and (b) distributing the at least one job selected in step (a) to at least one processor station in the plurality of processor stations that has an average load value less than the load value of the local processor station by a threshold, the load value of the local processor station corresponding to an instantaneous queue length of the local processor station, the instantaneous queue length indicating the number of jobs awaiting processing at the local processor station, each average load value of other processor stations corresponding to a queue length for each respective processor station averaged over an announcement interval.

2. The method of claim 1, further comprising:

(c) selecting, from the plurality of processor stations, a subset of processor stations each having the average load value less than the load value for the local processor station by a threshold;

wherein said distributing step (b) distributes the at least one job selected in step (a) among the processor stations in the subset of processor stations selected in step (c).

3. The method of claim 2, wherein a number of jobs selected for remote execution in step (a) is substantially equal to:

$$\frac{\tau}{y + p_t + o_t}$$

where:

τ is an execution time needed to off-load the jobs to the subset of processor stations, y is an average servicing time per job executed over the announcement interval, $p_t$ is a processing time needed to decide whether to execute the jobs either locally or remotely, and $o_t$ is a fixed overhead time for transmitting one job to one processor station in the subset.

4. The method of claim 3, wherein the execution time, τ, is substantially equal to:

$$\left(\frac{N*(y + p_t)}{W} - U\right) * W$$

where:

W is the announcement interval,

N is the number of jobs that have been executed in a current announcement interval, and U is a target queue length.

5. The method of claim 2, wherein the at least one job is selected in step (a) so that the instantaneous queue length of the local processor station is reduced to substantially the average queue length of the processor station in the subset having the lowest average queue length.

6. The method of claim 2, further comprising:

(d) receiving, over the communications channel, a multicast packet indicating the queue length of each remaining processor station in the plurality of processor stations, averaged over the announcement interval.

7. The method of claim 6, wherein said receiving step (d) is periodically repeated with updated queue length over the announcement interval.

8. The method of claim 2, wherein the at least one job is distributed in said step (b) to at least one target processor station within the subset of processor stations by random.

9. The method of claim 2, wherein the at least one job is distributed in said step (b) to at least one target processor station within the subset of processor stations by round robin.

10. The method of claim 1, wherein the at least job is selected in step (a) using hysteresis.

11. The method of claim 10, wherein the at least one job is selected in step (a) only when:

(i) the number of packets associated with the at least one job is less than a high-level mark, and (ii) when the high-level mark was previously exceeded, the number of packets associated with the at least one job is less than a low-level mark.

12. The method of claim 2, further comprising:

(d) sending, over the communications channel, a multicast packet indicating the queue length of the local processor station, averaged over the announcement interval.

13. A system for balancing a job load within a network of processor stations, comprising:

a communications channel; and a plurality of processor stations each being connected to said communications channel, each processor station having a processor, a computer-readable memory, an input port including a queue to be coupled to an input device, an output port to be coupled to an output device and a network port to be coupled to the communications channel;

a local processor station selecting at least one job for remote execution so that an instantaneous queue length of the local processor station is reduced to an average queue length of other processor stations in the plurality of processor stations, the local processor station distributing the at least one job to at least one processor station in the plurality of processor stations that has an average load value less than the load value of the local processor station by a threshold.

14. The method of claim 13, wherein:

the local processor selecting from said plurality of processor stations a subset of processor stations each having the average queue length less than the instantaneous queue length of the local processor station by a threshold, and the local processor distributing the at least one job among to at least one processor station in the subset of processor stations.

15. An apparatus for distributing a job load from a local processor station to at least one processor station within a plurality of processor stations connected by a communications channel, comprising:

means for selecting at least one job for remote execution from the local processor so that a load value of the local processor station is reduced to a target load value corresponding to an average load value of other processor stations in the plurality of processor stations, and means for distributing the at least one job among the processor stations that has an average load value less than the load value of the local processor station by a threshold, the load value of the local processor station corresponding to an instantaneous queue length of the local processor station, the instantaneous queue length indicating the number of jobs awaiting processing at the local processor station, each average load value of other processor stations corresponding to a queue length for each respective processor station averaged over an announcement interval.

16. The apparatus of claim 15 further comprising:

means for selecting, from the plurality of processor stations, a subset of processor stations each having the average load value less than the load value of the local processor station by a threshold;

said distributing means distributes the at least one job to at least one processor station in the subset of processor stations.

* * * * *